UNITED STATES PATENT OFFICE.

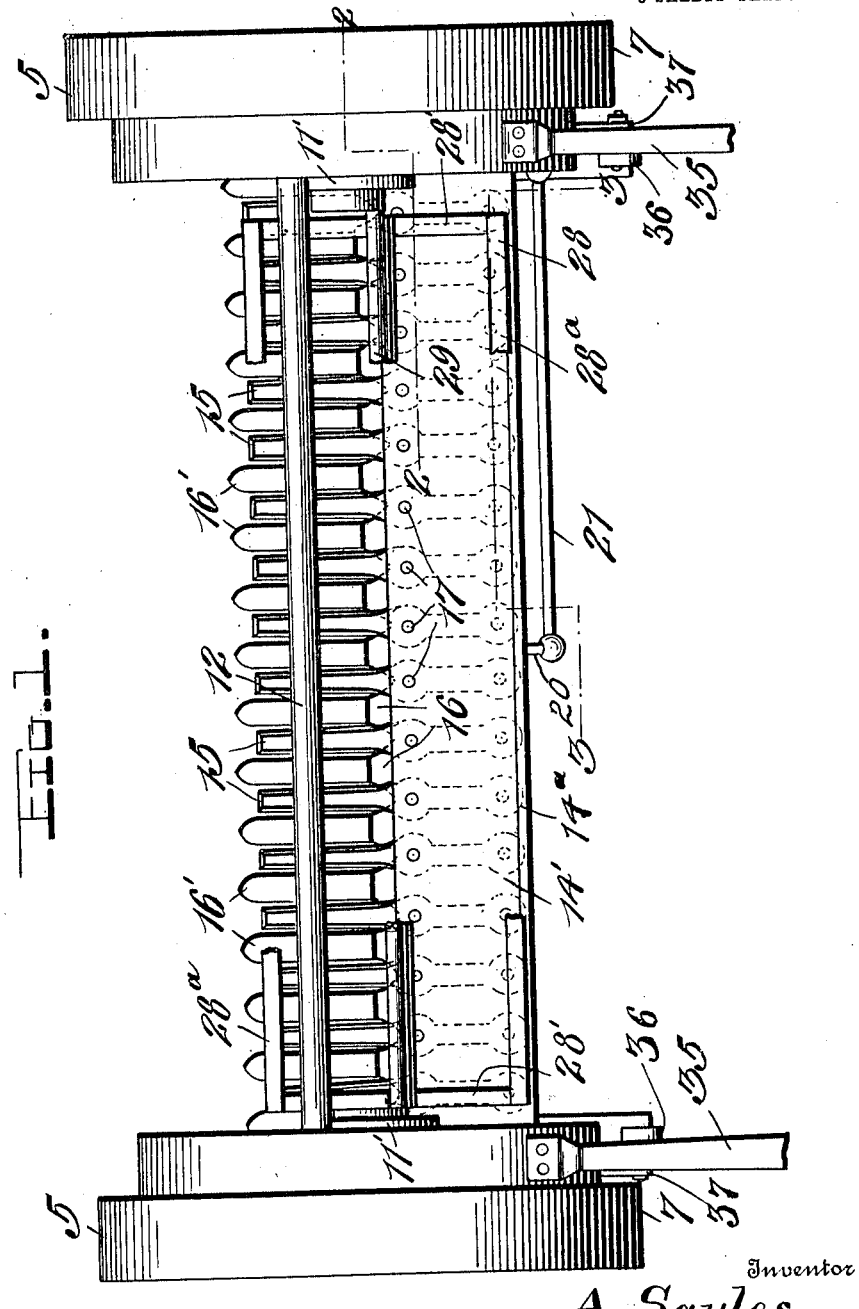

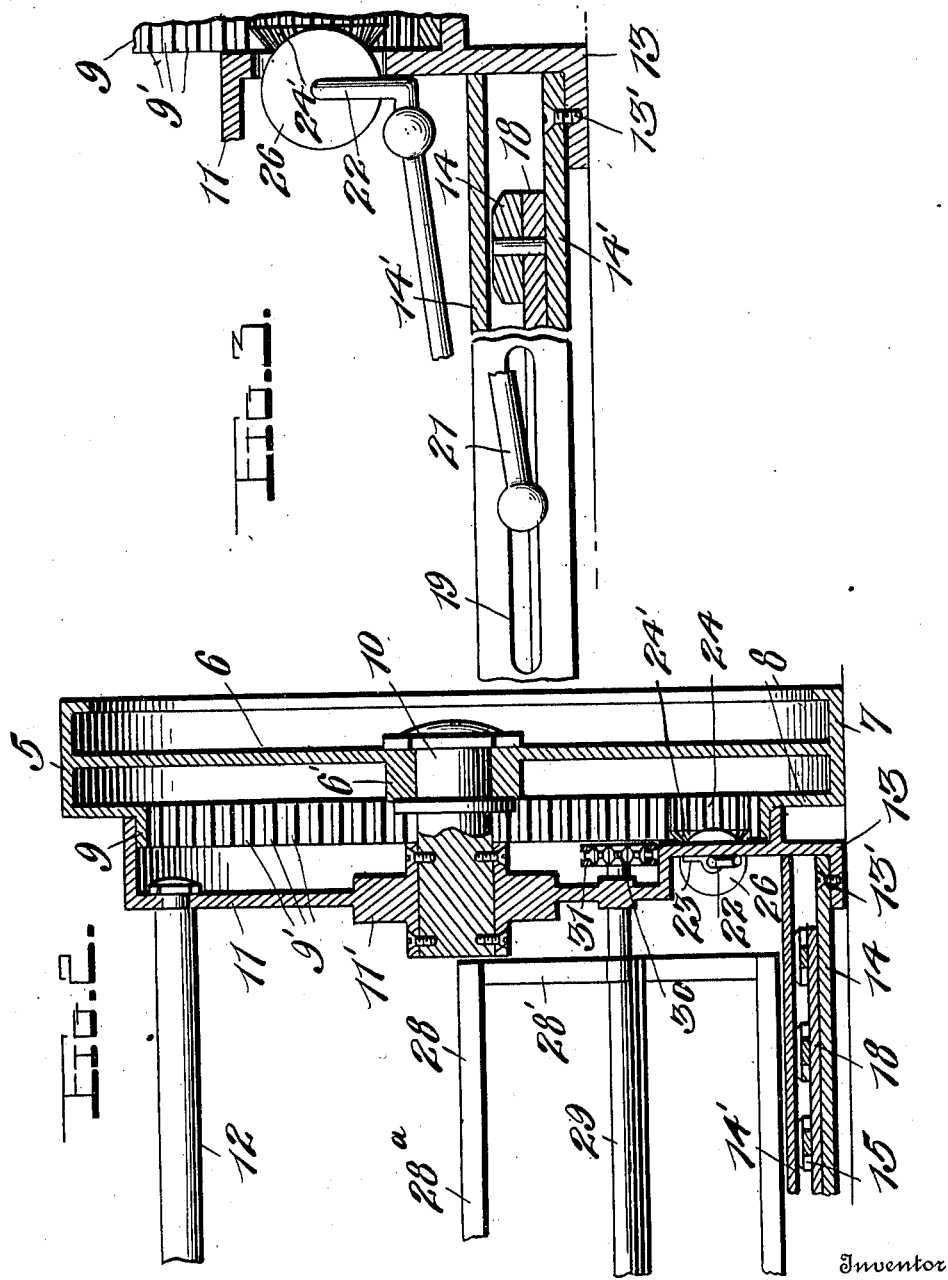

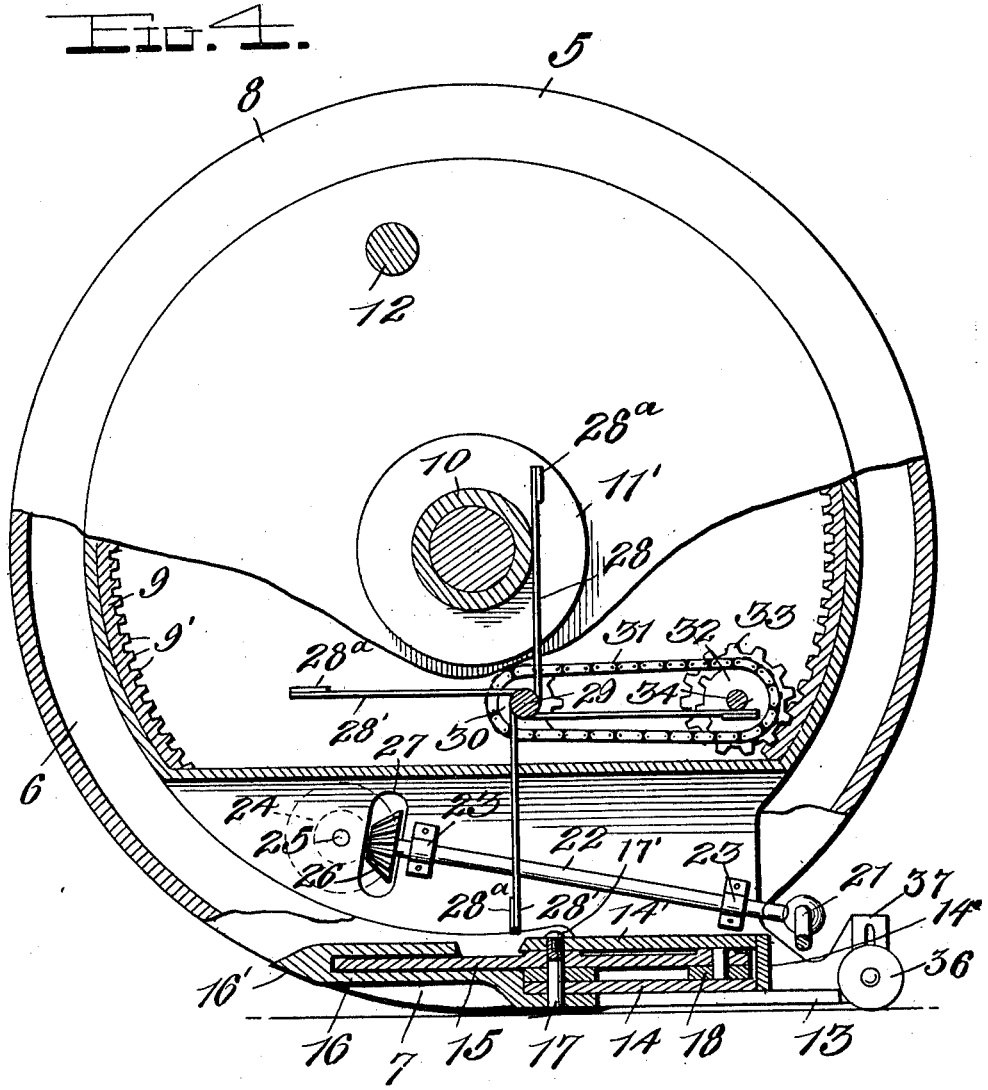

ALPHEUS SAYLES, OF INDEPENDENCE, IOWA.

LAWN-MOWER.

984,445.  Specification of Letters Patent.  Patented Feb. 14, 1911.

Application filed October 12, 1910. Serial No. 586,673.

*To all whom it may concern:*

Be it known that I, ALPHEUS SAYLES, a citizen of the United States, residing at Independence, in the county of Buchanan and State of Iowa, have invented certain new and useful Improvements in Lawn-Mowers, of which the following is a specification, reference being had to the accompanying drawings.

This invention relates to improvements in mowing machines and more specifically to machines of that character commonly known as lawn mowers and includes new and novel means for transmitting power to the reciprocatory cutter bar to simultaneously actuate a plurality of cutting blades whereby the same are moved across the intermediate cutting fingers to effect a shear cut of the grass or other material.

The invention further consists in the provision of a light, simple and efficient mowing machine of the above described character whereby grass or other material may be easily and quickly cut either in a wet or dry state, without interference with the working elements of the machine.

Another object is to provide a positive acting durable lawn mower and a revoluble reel mounted above the cutting teeth and movable over the same to free the teeth and the fingers of the cut material which may accumulate thereon.

With these and other objects in view, the invention consists of the novel features of construction, combination and arrangement of parts hereinafter fully described and claimed, and illustrated in the accompanying drawings, in which—

Figure 1 is a top plan view of a mowing machine constructed in accordance with my invention the reel being partly broken away; Fig. 2 is a section taken on the line 2—2 of Fig. 1; Fig. 3 is a section taken on the line 3—3 of Fig. 1; and Fig. 4 is an end elevation, the wheel and gear casing being shown in section.

Referring in detail to the accompanying drawings 5 designates the supporting wheels which are arranged at opposite ends of the machine frame and support the same for movement over the ground in a manner to be hereinafter specifically described. The wheels 5 are each made in the form of a central web 6 having a ground engaging tread 7 formed on its periphery, said tread extending upon each side of the web. The edges of the tread 7 are formed with circumscribing inwardly extending flanges 8 and the inner flange is further formed with a laterally extending annular flange 9. The flange 9 is provided with internal gear teeth 9′ for the transmission of power in the operating mechanism of the mower as will be more clearly disclosed by the following description.

The webs 6 of the supporting wheel 5 are centrally formed with the hubs 6′ which are mounted upon the outer ends of the stud shafts 10 centrally fixed in a central bearing 11′ formed on a circular gear case 11. This gear case incloses the flange 9 of the wheel, said wheel revolving on the stud shaft 10. The casings 11 are rigidly connected by means of a rod 12 and at the outer edge of said casings at the bottoms thereof the angularly and inwardly disposed supporting plates 13 are formed. Upon these plates 13 the ends of a cutter bar case 14 are supported and rigidly secured. This case or housing 14 is for the purpose of protecting the cutter bar and the pivots of the cutter blades and comprises a base plate which is secured at its ends to the supporting flanges 13 by means of a screw 13′, and a cover plate 14′ which is arranged above and in spaced relation to the base of the case. Between the cover plate and the base, the cutting blades 15 are mounted. The usual finger bar 16 is rigidly secured to the outer edge of the base of the case or housing 14 and has formed thereon a plurality of fingers 16′ through and between which the cutting blades 15 are adapted to move. The cutting blades are pivotally mounted intermediate of their ends upon the pins 17, the upper and lower ends of which are fixed in the cover 14′ and the base plate of the case 14. These pivot pins also extend through the finger bar 16 and serve to secure the same to the base plate. Screws 17′ are threaded into the upper ends of the pins 17 and effectively secure said pins in the base and cover plates of the case 14. The rear ends of the blades 15 are pivotally connected to the reciprocatory cutter bar 18 which is movably disposed within the case 14. A rear shield or protecting plate 14ª is disposed upon the longitudinal rear edges of the base and the cover plate 14′ of the cover bar case and is secured thereto in any preferred manner. This shield plate is provided with an elongated longitudinal slot 19 through which a short connecting rod 20 carried by the cutter bar extends. The outer end of the cutter bar is connected to one end of a pitman rod 21 by the usual ball and socket joint, the other end of said rod being universally connected by means of a similar joint to the rear end of a crank shaft 22 which is mounted in suitable bearings 23 arranged upon the gear protecting case 11.

Power is transmitted to the pitman rod through the crank shaft by means of a pinion 24 which is mounted upon a short shaft 25 fixed at one end in the plate 11. This pinion is formed with a frusto-conical beveled or mitered toothed portion 24' which meshes with a beveled pinion 26 fixed to the forward end of the crank shaft 22. The main or body portion of the pinion 24 meshes with the internal teeth 9' of the flange 9 formed upon the supporting wheel 5 whereby in the movement of the machine rotation is imparted to the pinion 24 and transmitted through the pinion 26 and the crank shaft 22 to the pitman rod 21 whereby the cutter bar 18 is longitudinally reciprocated to oscillate the cutting blades through the fingers to perform a shearing cutting action. The case plate 11 is provided with a short slot or aperture 27 through which the pinion 26 extends for engagement with the beveled toothed portion of the pinion 24.

In order to prevent the accumulation of grass or other matter upon the cutting blades 15 and between the fingers 16, I provide a reel 28 which is fixed upon a shaft 29 revolubly mounted in the plates 11 below the wheel shafts 10. Sprocket pinions 30 are fixed upon the ends of the reel shaft 29 and are connected by means of a drive chain 31 with a sprocket 32 integrally formed upon one face of a gear 33 which is mounted upon a stud shaft 34 rigidly fixed in the case plate 11. The gear 33 of course meshes with the internal teeth 9' of the supporting wheel whereby power is transmitted through the medium of the connecting chain 31 to the wheel shaft. Thus the reel is continuously revolved in the cutting action of the blades 15. While the reel may be of any preferred construction, I preferably provide the radial arms 28' fixed to the shaft 29 adjacent its ends, the outer end of corresponding arms at the opposite ends of the reel shaft being connected by the metal plates 28ª. These plates move across the upper surfaces of the fingers 16 and throw the grass or other material rearwardly or in a reverse direction to the movement of the machine whereby the uncut portion in front of the machine is kept clear of the cut material.

To the case plates 11 the ends of a U-shaped frame bar 35 are secured and to the intermediate portion of said bar suitable handles (not shown) are adapted to be rigidly connected whereby the machine may be conveniently moved or pushed by the operator.

The flanges 13 are each formed with a slotted extension 37 in which the supporting casters or rollers 36 are mounted. These casters are for the purpose of supporting the cutter or sickle bar to relieve the friction or drag of the same upon the ground surface and to secure a high or low cut of the grass or other material.

From the foregoing it is thought that the construction and operation of my improved mowing machine will be clearly understood. The power transmission mechanism affords a more direct connection between the cutter bar and the drive wheel than in machines of a similar character as heretofore constructed. This gearing is effectually protected from the accumulations of dust and dirt thus reducing to a minimum wear upon the various parts and consequently increasing the durability of the machine. By providing a reel for operation in conjunction with the cutting teeth, the teeth and fingers are at all times kept clear of the cut material, thus greatly facilitating the easy operation of the machine and maintaining a high degree of efficiency.

While I have specifically shown and described the preferred construction and arrangement of the various parts, it will be obvious that the machine is susceptible of considerable modification without departing from the essential feature or sacrificing any of the advantages of the invention.

Having thus described the invention what is claimed is:—

1. In a machine of the character described, the combination of supporting wheels, each of said supporting wheels having an internal gear formed thereon, a circular plate disposed over said internal gears a rod rigidly connecting said plates, stud shafts mounted in said plates for supporting the wheels, a reciprocatory cutter bar arranged between the supporting wheels, a housing for said bar, a finger bar rigidly secured to said housing and extending forwardly thereof, a plurality of cutting blades pivoted at their rear ends to said bar, said blades being pivoted intermediate of their ends in the housing and movable between the fingers of said finger bar, a crank shaft mounted on the plate which is disposed over the gear of the supporting wheel, power transmission means between said internal gear and the crank shaft to rotate the latter, and a pitman connecting said crank shaft and the cutter bar to reciprocate said bar.

2. In a machine of the character described, the combination of supporting wheels each having formed thereon an internal gear, a case plate having an annular flange disposed over said gear, stud shafts centrally fixed in said plate, said supporting wheels being revolubly mounted on the shafts, a rod rigidly connecting the plates, an inwardly extending flange formed on each of said plates at its lower edge, a reciprocatory cutter bar arranged between the supporting wheels, a housing for said bar rigidly fixed upon the flanges of said plates, a finger bar secured to said housing and extending forwardly thereof, a plurality of cutting blades pivoted at their rear ends to the reciprocatory cutter bar and disposed in said housing, said plates being pivoted intermediate of their ends in the housing and movable through the fingers on the finger bar, the rear edge of said housing having an elongated slot therein, a connecting rod carried by the cutter bar, said rod extending through said slot, a crank shaft mounted in bearings on one of the case plates, a pinion mounted on said plate engaging with the internal gear of the supporting wheel, said pinion having a beveled toothed portion, a beveled pinion fixed on one end of the crank shaft engaging with the beveled portion of the pinion on said case plate, and a pitman rod connected to the crank of said shaft and to the connecting rod of the cutter bar to transmit power from the supporting wheel for the reciprocation of said bar.

3. In a machine of the character described, the combination of supporting wheels each having an internal gear, a case plate extending over said gear, stud shafts mounted in the case plates, said wheels being revolubly mounted thereon, a rod rigidly connecting the plates, cutting mechanism mounted upon said plates between the supporting wheels, power transmission means between the internal gear of one of the wheels and said cutting mechanism to actuate the latter, a shaft revolubly mounted in the case plates having a reel fixed thereon movable over the cutting mechanism, sprocket pinions fixed on the ends of said shaft, gears mounted on the case plates meshing with the internal gears of the supporting wheels, sprockets formed on said gears, and connecting chains extending over said sprockets and the sprocket pinions on the reel shaft whereby said reel is revolved simultaneously with the actuation of the cutting mechanism.

In testimony whereof I hereunto affix my signature in the presence of two witnesses.

ALPHEUS SAYLES.

Witnesses:
J. A. WELLS,
EVA M. KLINE.